(12) United States Patent
Tokuoka et al.

(10) Patent No.: US 7,638,010 B2
(45) Date of Patent: Dec. 29, 2009

(54) MULTILAYER CERAMIC DEVICE AND THE PRODUCTION METHOD THEREOF

(75) Inventors: Yasumichi Tokuoka, Chuo-ku (JP); Shigeki Satou, Chuo-ku (JP); Tatsunori Satou, Chuo-ku (JP)

(73) Assignee: TDK Corporation, Tokyo (JP)

( * ) Notice: Subject to any disclaimer, the term of this patent is extended or adjusted under 35 U.S.C. 154(b) by 441 days.

(21) Appl. No.: 10/563,592

(22) PCT Filed: Jul. 5, 2004

(86) PCT No.: PCT/JP2004/009533

§ 371 (c)(1), (2), (4) Date: Jan. 6, 2006

(87) PCT Pub. No.: WO2005/017928

PCT Pub. Date: Feb. 24, 2005

(65) Prior Publication Data

US 2006/0158826 A1 Jul. 20, 2006

(30) Foreign Application Priority Data

Jul. 9, 2003 (JP) .............................. 2003-194055

(51) Int. Cl.
*C03B 29/00* (2006.01)
*H01G 4/06* (2006.01)
(52) U.S. Cl. .............. 156/89.12; 156/89.14; 156/89.16; 361/321.2; 361/321.3
(58) Field of Classification Search .............. 156/89.12, 156/89.14, 89.16; 361/321.2, 321.3
See application file for complete search history.

(56) References Cited

U.S. PATENT DOCUMENTS

| | | | | |
|---|---|---|---|---|
| 5,248,712 A | * | 9/1993 | Takeuchi et al. | ............... 524/56 |
| 5,929,727 A | * | 7/1999 | Kagata et al. | ................ 333/222 |
| 6,475,317 B1 | * | 11/2002 | Baba et al. | ................ 156/89.12 |
| 6,805,763 B2 | * | 10/2004 | Iwase et al. | ............... 156/89.12 |
| 2001/0006451 A1 | * | 7/2001 | Miyazaki et al. | ......... 361/321.2 |
| 2001/0010617 A1 | * | 8/2001 | Miyazaki et al. | ......... 361/321.2 |
| 2003/0016484 A1 | * | 1/2003 | Iwaida et al. | ............. 361/306.3 |
| 2003/0230374 A1 | * | 12/2003 | Yamana et al. | ........... 156/89.12 |
| 2007/0095456 A1 | * | 5/2007 | Okuyama et al. | ........ 156/89.12 |

FOREIGN PATENT DOCUMENTS

CN 1300089 A 6/2001

(Continued)

*Primary Examiner*—Philip C Tucker
*Assistant Examiner*—Michael N Orlando
(74) *Attorney, Agent, or Firm*—Oliff & Berridge, PLC (57) ABSTRACT

A production method of a multilayer ceramic device is provided, by which, for example, a multilayer ceramic capacitor having a large capacity, wherein the interlayer thickness is made as thin as about 2.5 μm or thinner, can be produced at a high production yield without causing unsticking between layers and internal defects. In the present invention, when assuming that a first weight ratio (wt %) of the first organic binder component with respect to a first inorganic dielectric colorant powder in said green sheet slurry for forming a green sheet 10a is (A), and a second weight ratio (wt %) of the second organic binder component with respect to said second inorganic dielectric colorant powder in said electrode level difference absorbing dielectric paste for forming a dielectric blank pattern layer 24 is (B), the second weight ratio (B) is larger than the first weight ratio (A).

6 Claims, 3 Drawing Sheets

FOREIGN PATENT DOCUMENTS

| | | |
|---|---|---|
| JP | A 56-94719 | 7/1981 |
| JP | A 03-074820 | 3/1991 |
| JP | A 09-106925 | 4/1997 |
| JP | A 2001-126951 | 5/2001 |
| JP | 2001-237140 A | 8/2001 |
| JP | 2001-261448 * | 9/2001 |
| JP | A 2001-358036 | 12/2001 |
| JP | A 2002-043161 | 2/2002 |
| JP | A 2002-284580 | 10/2002 |
| JP | A 2003-059759 | 2/2003 |

* cited by examiner

MULTILAYER CERAMIC DEVICE AND THE PRODUCTION METHOD THEREOF

TECHNICAL FIELD

The present invention relates to a production method of a multilayer ceramic device, such as a multilayer ceramic capacitor, and particularly relates to a production method of a multilayer ceramic device, wherein an effect of a level difference is reduced by burying a gap arising on an electrode pattern layer when producing a ceramic green sheet multilayer body with a level difference absorbing blank pattern layer.

BACKGROUND ART

For example, a multilayer ceramic capacitor is produced by the procedure below.

First, dielectric slurry obtained by dispersing inorganic colorant powder (ceramic dielectric powder) in a solvent including a nonvolatile organic component, such as a dispersant, polymeric resin and plasticizer, is produced. Next, the dielectric slurry is applied to a plastic support film by the doctor blade method, nozzle method or other means and dried to obtain a dielectric green sheet.

Next, an electrode pattern layer is formed on the dielectric green sheet. The electrode pattern layer is generally formed by performing screen printing of an electrode paste.

Next, the dielectric green sheet including the electrode pattern layers is removed from the support base film, cut to be a predetermined size, then, stacked for a plurality of times while aligning pattern positions of the electrode pattern layers, pressured and bonded, so that a ceramic green multilayer body is obtained. Next, the multilayer body is cut to be a predetermined size to form a chip, then, fired at a predetermined temperature and atmosphere. The thus obtained fired body chip is applied with external electrodes and burnt at its end portions, so that a multilayer ceramic capacitor is completed.

In the production procedure of the multilayer ceramic capacitor as above, when forming an electrode pattern layer in a predetermined pattern on the dielectric green sheet, there is a level difference gap blank portion, on which the electrode pattern layer dose not exist. Due to the level difference gap portion, a level difference is formed on a surface of the dielectric green sheet. A number of the electrode pattern layers with the level difference gap portion are stacked via green sheets. Since the stacked body is pressured and bonded after that, the level difference gap portions are crushed. Therefore, the larger the number of stacked layers of the multilayer body and the thinner a thickness of the green sheet is, the larger the effects of the accumulated level difference becomes.

As a result, a green sheet sandwiched by the portions of the electrode pattern layers is tightly pressured and bonded to obtain a high density, while a density of a green sheet sandwiched by portions having the level difference gap portions becomes lower comparing with that on other portions, so that a density difference arises in the multilayer ceramic body. Also, there arises a disadvantage that adhesiveness with the upper and lower green sheets declines in the green sheet sandwiched by the portions with the level difference gap portions.

The multilayer body is cut to be a chip after that, then, fired, but when a multilayer body having the above problem is fired, it easily cracks between layers, which has to be overcame. Also, there is a problem that structural defects, such as chip deformation, a short-circuiting defect, cracks and delamination, often arise after firing the multilayer body.

To solve the above problems, for example as shown in the patent articles 1 to 5 below, methods of burying a level difference gap portion with a blank pattern layer generated by printing an electrode paste have been proposed. According to these methods, a surface including an electrode layer can be made flat and the problems in the ceramic capacitor due to a level difference as explained above can be improved.

Patent Article 1: The Japanese Unexamined Patent Publication No. 56-94719

Patent Article 2: The Japanese Unexamined Patent Publication No. 3-74820

Patent Article 3: The Japanese Unexamined Patent Publication No. 9-106925

Patent Article 4: The Japanese Unexamined Patent Publication No. 2001-126951

Patent Article 5: The Japanese Unexamined Patent Publication No. 2001-358036

DISCLOSURE OF THE INVENTION

In recent years, multilayer ceramic capacitors are demanded to have a larger number of layers and a larger capacity. Therefore, there has been proposed an attempt of making a thickness of the green sheet 3 µm or thinner (2.5 µm or thinner as an interlayer thickness after firing).

However, the present inventors have found that, when a thickness of the green sheet is made as thin as 3 µm or thinner, a problem is newly caused by the weak adhesiveness on a contact surface between the green sheet and the dielectric blank pattern layer in the technique of the related art explained above. For example, dielectric green sheets deviate from one another when stacked, so that positional deviation easily arise between patterns of the upper and lower electrode layers, and the positional deviation accumulates as the layers increase, which results in a problem of causing a cutting defect in the cutting step. Also, there arises a problem that stacking deviation and cracks on the multilayer body easily arise in the cutting step.

Furthermore, since a volume shrinkage amount in the subsequently performed binder removal step and firing step slightly differs between the ceramic green sheet, electrode pattern layer and level difference absorbing dielectric blank pattern layer, the contact surface is unable to endure a generating stress, and there also arises a problem that chaps and cracks easily arise along the boundary.

The present invention was made in consideration of the above circumstances and has as an object thereof to provide a production method of a multilayer type electronic device capable of producing a multilayer ceramic device, such as a multilayer ceramic capacitor having a high capacity, wherein an interlayer thickness is made as thin as about 2.5 µm or thinner, at a high production yield without causing unsticking between layers and internal defects, etc.

To attain the above object, a production method of a multilayer ceramic device according to the present invention comprises the steps:

forming a green sheet by using a green sheet slurry;

forming an electrode pattern layer on the green sheet;

forming a dielectric blank pattern layer on level difference gap portion on the green sheet so as to bury the level difference by using dielectric paste;

forming a multilayer body by stacking a plurality of stacking units, wherein the stacking unit is the green sheet formed with the dielectric blank pattern layer and the electrode pattern layer; and firing the multilayer body;

wherein:

the green sheet slurry includes a first inorganic dielectric colorant powder and a first organic binder component;

the electrode level difference absorbing dielectric paste includes a second inorganic dielectric colorant powder and a second organic binder component; and when a first weight ratio of the first organic binder component with respect to the first inorganic dielectric colorant powder in the green sheet slurry is (A), and a second weight ratio of the second organic binder component with respect to the second inorganic dielectric colorant powder in the electrode level difference absorbing dielectric paste is (B), the second weight ratio (B) is larger than the first weight ratio (A).

The green sheet is, for example, a part to be a dielectric layer composing a capacitance of a capacitor after firing. When the first weight ratio (A) of the first organic binder component with respect to the first inorganic dielectric colorant powder in green sheet slurry composing the green sheet is too high, a density of the first inorganic dielectric colorant powder becomes too low and a variety of disadvantages tend to arise.

On the other hand, the dielectric blank pattern layer is a part not affecting short-circuiting, etc. of the capacitor after firing. Also, the dielectric blank pattern layer has a smaller occupying area comparing with that of the green sheet. Accordingly, there are not any problems even when the second weight ratio (B) of the second organic binder component with respect to the second inorganic dielectric colorant powder in the electrode level difference absorbing dielectric paste composing the dielectric blank pattern layer is higher than the first weight ratio (A).

In fact, by making the second weight ratio (B) higher than the first weight ratio (A), adhesiveness between the green sheet and the dielectric blank pattern layer contacting each other in the stacking direction can be improved. Note it was first found by the present inventors that adhesiveness of a contacting surface of the green sheet and the dielectric blank pattern layer could be improved by increasing an amount of the organic binder component in the electrode level difference absorbing dielectric paste to be larger than that of the organic binder component in the green sheet slurry.

In the present invention, it is possible to improve adhesiveness between the green sheet and the dielectric blank pattern layer even when producing a multilayer ceramic device, such as a multilayer ceramic capacitor having a high capacity, wherein particularly a thickness of the green sheet is made as thin as 3 μm or thinner (a thickness between layers in the fired stacked body is 2.5 μm or thinner).

Therefore, green sheets do not deviate when stacked, positional deviation of patterns of the upper and lower electrode layers is hard to be caused, the positional deviation is not accumulated even if the layers increase, and cutting defects are unlikely to be caused in the cutting step of the multilayer body. Also, stacking deviation and cracking of the multilayer body, etc. are hard to be caused. Furthermore, also in the subsequently performed binder removal step and firing step, chaps and cracks along boundaries of the multilayer body are hard to be caused. Accordingly, in the present invention, it is possible to produce a multilayer ceramic device at a high production yield without causing any unsticking between layers and internal defects, etc.

Furthermore, in the present invention, the dielectric blank pattern layer is formed on the level difference gap portion in the electrode pattern layer and a surface of the green sheet having electrode pattern layer is made flat without any level differences, so that disadvantages at the time of stacking or after firing caused by the level differences can be eliminated.

The first organic binder component and/or the second organic binder component are composed of a polymeric resin and a plasticizer.

Preferably, the second weight ratio (B) in the electrode level difference absorbing dielectric paste is 5 to 40 wt %. When the ratio is too small, the effect of the present invention becomes small, while too large, an excessive plasticizer eludes on the printing surface or soaks into the dielectric green sheet to easily deteriorate the sheet property. Furthermore, an organic component amount with respect to the dielectric inorganic colorant become relatively large and a density of the inorganic dielectric colorant powder reduces, so that it easily leads to problems that time required by binder removal becomes long, volume shrinkage increases in the binder removal step, the electrode layers deform, and cracks increase.

Preferably, a weight ratio of the polymeric resin is 10 wt % or less with respect to the inorganic dielectric colorant powder. Since the polymeric resin exists as a solid content in the film of the dielectric blank pattern layer after removing plasticizer, when it exceeds 10 wt %, a density of the inorganic dielectric colorant powder becomes low to result in a high tendency of causing an increase of volume shrinkage in the residual binder removal step, deformation of electrode layers and increase of cracks.

Preferably, a value (B−A) obtained by subtracting the first weight ratio (A) from the second weight ratio, (B) is 1.5 or larger. When (B−A) is too small, the effect of the present invention becomes small.

The multilayer ceramic device according to the present invention is obtained by any one of the above production methods. In the present invention, the multilayer ceramic device is not particularly limited and a multilayer ceramic capacitor and a multilayer inductor, etc. may be mentioned.

BEST MODE FOR CARRYING OUT THE INVENTION

Below, the present invention will be explained based on embodiments shown in the drawings.

First, as an embodiment of an electronic device according to the present invention, an overall configuration of a multilayer ceramic capacitor will be explained.

Figure 1:
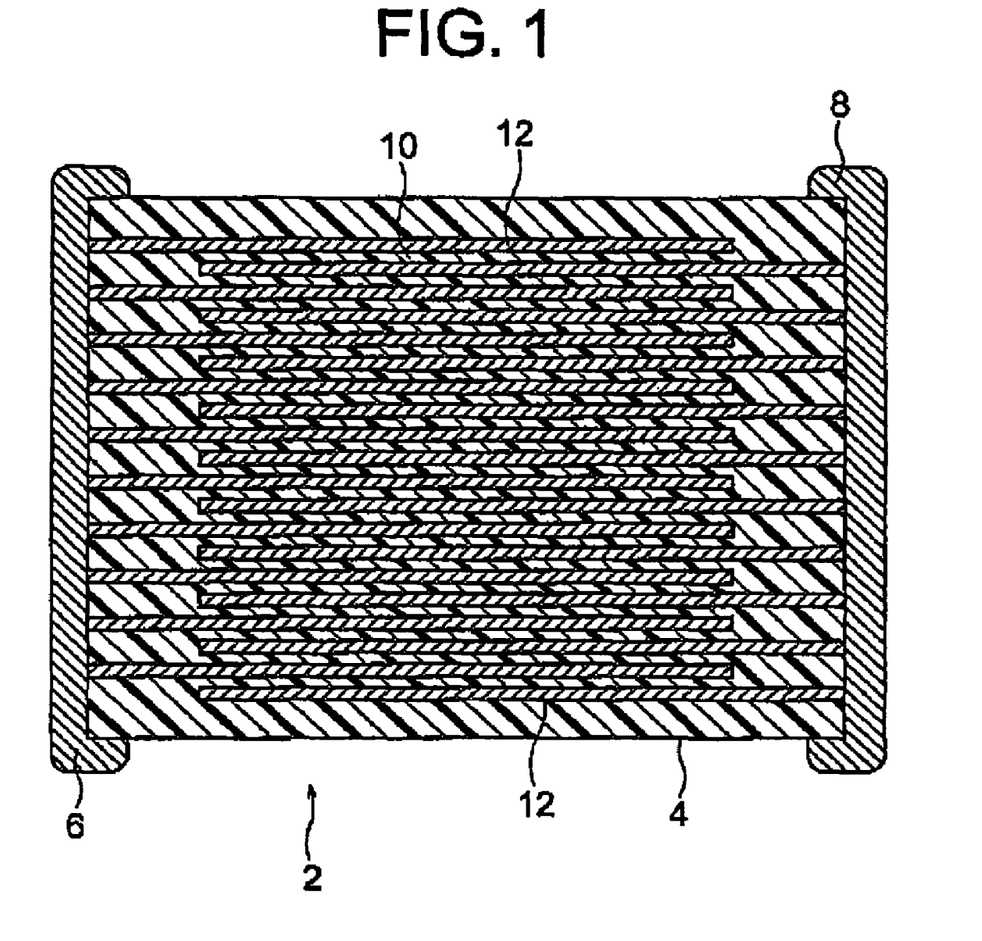
FIG. 1 is a schematic sectional view of a multilayer ceramic capacitor obtained by a production method according to an embodiment of the present invention.

As shown in FIG. 1, the multilayer ceramic capacitor 2 according to the present embodiment has a capacitor element body 4, a first terminal electrode 6 and a second terminal electrode 8. The capacitor element body 4 has dielectric layers 10 and electrode layers 12, and the electrode layers 12 are stacked alternately between the dielectric layers 10. One side of the alternately stacked electrode layers 12 is electrically connected to inside of a first terminal electrode 6 formed outside of the first terminal portion of the capacitor element body 4. While, the other side of the alternately stacked electrode layers 12 is electrically connected to inside of the second terminal electrode 8 formed outside of a second end portion of the capacitor element body 4.

A material of the dielectric layer 10 is not particularly limited and composed of a dielectric material, such as calcium titanate, strontium titanate and/or barium titanate. A thickness of each of the dielectric layers 10 is not particularly limited, but generally several μm to hundreds of μm. Particularly in the present embodiment, it is made as thin as preferably 5 μm or thinner, more preferably 2.5 μm or thinner, and particularly preferably 1.5 μm or thinner.

A material of the electrode layer 12 is not particularly limited and it is composed of nickel, a nickel alloy, silver, palladium, copper, a copper alloy, or other metal or an alloy. A thickness of the internal electrode layer 12 is not thicker than that of the dielectric layer 10.

Also, a material of the terminal electrodes 6 and 8 is not particularly limited, but normally copper, a copper alloy, nickel and a nickel alloy, etc. are used. Silver or an alloy of silver and palladium, etc. may be also used. A thickness of the terminal electrodes 6 and 8 is not particularly limited and is normally 10 to 50 μm or so.

A shape and size of the multilayer ceramic capacitor 2 may be suitably determined in accordance with the use object. When the multilayer ceramic capacitor 2 is rectangular parallelepiped, the size is normally a length (0.6 to 5.6 mm, preferably 0.6 to 3.2 mm)×a width (0.3 to 5.0 mm, preferably 0.3 to 1.6 mm)×a thickness (0.1 to 1.9 mm, preferably 0.3 to 1.6 mm) or so.

Next, an example of a production method of the multilayer ceramic capacitor 2 according to the present embodiment will be explained.

First, to produce a ceramic green sheet to compose the dielectric layers 10 shown in FIG. 1 after firing, dielectric slurry (green sheet slurry) is prepared.

The dielectric slurry is formed by dispersing a dielectric inorganic material (ceramic powder/the first inorganic dielectric colorant powder) in an organic solvent with an organic vehicle.

As the dielectric inorganic material, it is not particularly limited and a composition group including a variety of inorganic additives may be suitably selected to realize functions of a temperature compensation material and a high permittivity based material in addition to barium titanate, lead-containing perovskite and alumina, etc. These materials may be suitably selected from a variety of compounds, which become composite oxides or oxides, such as carbonate, nitrite, hydroxide and organic metal compound and mixed to be used. The dielectric material is normally used as powder having an average particle diameter of 0.4 μm or smaller, and preferably 0.1 to 3.0 μm or so. Note that it is preferable to use a smaller powder comparing with a green sheet thickness to form an extremely thin green sheet.

The organic vehicle is obtained by dissolving an organic binder component in an organic solvent. The organic binder component indicates a polymeric resin as a binder resin or a polymeric resin and plasticizer.

The organic solvent used for the organic vehicle is not particularly limited and acetone, toluene, methylethyl ketone, methyl alcohol, ethyl alcohol, isopropyl alcohol, xylene and other organic solvent may be used.

The polymeric resin to be used as the organic vehicle is not particularly limited and a cellulose based resin including a variety of cellulose derivatives, such as cellulose ester and cellulose ether; an acetal resin; butyral resin; an acrylic based resin obtained by polymerizing an acrylic resin and a derivative thereof; a methacrylate based resin obtained by polymerizing methacrylate and a derivative thereof; an olefin based resin including a variety of copolymers with ethylene or propyrene and vinyl acetate, acrylic acid, acrylic ester, methacrylate, methacrylate ester, glycidic acid, glycidic acid ester, etc.; an urethane resin and an epoxy resin, etc. may be mentioned. One or more kinds may be suitably selected from them.

The plasticizer is not particularly limited and dimethyl phthalate, diethyl phthalate, dibutyl phthalate, dioctyl phthalate, benzylbutyl phthalate and other phthalate ester, aliphatic dibasic acid ester, phosphorous ester, etc. may be used.

The organic binder component (a polymeric resin+plasticizer) in the dielectric slurry is preferably 3 to 16 wt % with respect to a dielectric inorganic colorant powder, and an adding quantity of the plasticizer is preferably not more than 100 wt % with respect to the polymeric resin. When the organic binder component is 3 wt % or less, it is liable that an effect of the bonding each inorganic dielectric colorant powder becomes reduced, powder of the inorganic colorant easily comes off from the green sheet, and strength of the sheet deteriorates. Also, when the organic binder component exceeds 16 wt %, the organic component amount becomes relatively large with respect to the dielectric inorganic colorant powder, consequently, time required for the binder removal becomes long and a density of the dielectric inorganic colorant powder in the green sheet becomes low, so that volume shrinkage in the binder removal step increases, which tends to lead to problems of a decline of final chip size accuracy, deformation of electrode layers and an increase of cracks. While, when the plasticizer amount exceeds 100 wt %, it is liable that strength of the dielectric green sheet declines and defects in the sheet increase because removing from the support film becomes difficult, etc.

In the dielectric slurry, a variety of dispersants, antistatic agents, release agents or other additives may be added in accordance with need. Note that a total content thereof is preferably 10 wt % with respect to the inorganic dielectric colorant powder.

Figure 2:
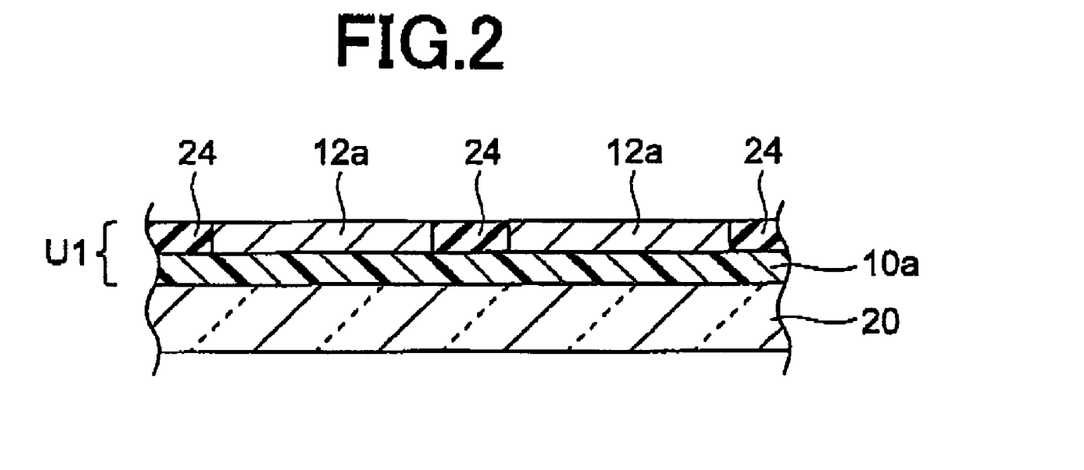
FIG. 2 is a sectional view of a key part showing a step of producing the multilayer ceramic capacitor shown in FIG. 1.

Next, by using the above dielectric slurry, a green sheet 10a is formed to be a thickness of preferably 3.0 μm or thinner and more preferably 0.5 to 2.5 μm or so on a carrier sheet 20 as a support sheet as shown in FIG. 2 by the doctor blade method, etc. The green sheet 10a is dried after forming the carrier sheet 20. A drying temperature of the green sheet 10a is preferably 50 to 100° C., and the drying time is preferably 1 to 5 minutes.

As the carrier sheet 20, for example, a PET film, etc. is used and those coated with silicon, etc. for improving releasability is preferable. A thickness of these carrier sheets 20 is not particularly limited and preferably 5 to 100 μm.

Next, in the present embodiment; as shown in FIG. 2, an electrode pattern layer 12a having a predetermined pattern and a dielectric blank pattern layer 24 having substantially the same thickness as that of the electrode pattern layer 12a are formed on the surface of the green sheet 10a by a printing method or a transfer method, etc. In the explanation below, a method of forming an electrode pattern layer 12a having a predetermined pattern and a dielectric blank pattern layer 24 by a screen printing method or a gravure printing method.

First, an electrode paste is prepared. The electrode paste is fabricated by kneading a conductive material composed of a variety of conductive metals and alloy, a variety of oxides, which becomes the above conductive materials after firing, organic metal compounds, or resinates, etc. with an organic vehicle.

As the conductive material to be used for producing an electrode paste, Ni, a Ni alloy or a mixture of these may be used. A shape of the conductive material is not particularly limited and may be a spherical shape or a depressed shape, etc. or a mixture of these shapes. Also, as to an average particle diameter of the conductive material, normally those having 0.05 to 1 µm and preferably 0.1 to 0.5 µm or so may be used.

As the organic vehicle for the electrode paste, the same organic vehicles as those for the electrode level difference absorbing dielectric paste are used.

After or before printing the electrode pattern layer in a predetermined pattern on the surface of the green sheet 10a by a printing method using electrode paste, a dielectric blank pattern layer 24 having substantially the same thickness as that of the electrode pattern layer 12a is formed on the surface of the green sheet 10a not having the electrode pattern layer 12a by a printing method using electrode level difference absorbing dielectric paste. Namely, the dielectric blank pattern layer 24 is formed on level difference gap portions on the electrode pattern layer 12a to bury level differences of the electrode pattern layer 12a having a predetermined pattern.

The dielectric blank pattern layer 24 shown in FIG. 2 can be formed on the surface of the green sheet 10a by a printing method, etc. using the electrode level difference absorbing printing method. When forming the dielectric blank pattern layer 24 (FIG. 2) on the surface of the green sheet 10a by a screen printing method, it is as explained below.

First, an electrode level difference absorbing dielectric paste is prepared. The electrode level difference absorbing dielectric paste is obtained by kneading a second inorganic dielectric colorant powder (ceramic powder) with an organic vehicle.

As the dielectric material (the second inorganic dielectric colorant powder) used when producing the electrode level difference absorbing dielectric paste is produced by using the same dielectric particle as that in the dielectric composing the green sheet 10a. The electrode level difference absorbing dielectric paste includes the dielectric powder and an organic vehicle.

As organic binder component (polymeric resin+plasticizer) and a variety of additives in the electrode level difference absorbing dielectric paste, those used in the green sheet slurry may be used. Note that they do not have to be completely the same as those used in the green sheet slurry and may be different from them. Also, as a solvent composing the organic vehicle, terpineol, dihydroterpineol, diethylene glycol monobutylether, diethylene glycol monobutylether acetate or other high boiling point solvent may be used.

In the present embodiment, a ratio of an organic binder component (the second wt % (B)) with respect to the dielectric inorganic colorant powder in the electrode level difference absorbing dielectric paste is larger than the ratio of organic binder component (the first wt % (A)) with respect to the dielectric inorganic colorant powder in the green sheet slurry. For example, $B-A \geq 1.5$. Also, a ratio of the polymeric resin with respect to the dielectric inorganic colorant powder in the electrode level difference absorbing dielectric paste is preferably not more than 10 wt %.

The polymeric resin exists as solid content in a dried film of the paste, a density of the inorganic dielectric colorant powder decreases when exceeding 10 wt %. Consequently, it is liable that volume shrinkage in the binder removal step increases, the electrode layer deforms and cracks increase. On the other hand, a ratio of the organic binder component with respect to the dielectric inorganic colorant powder in the electrode level difference absorbing dielectric paste is preferably 5 to 40 wt %.

When 5 wt % or less, strength of the dielectric blank pattern layer 24 for level difference absorbance becomes weak, powder of the inorganic dielectric colorant easily comes off, and adhesiveness with the dielectric green sheet declines when stacking, so that stacking defects or other problems tend to arise. While when 40 wt % or more, an excessive plasticizer eludes on the printing surface or soaks on the dielectric green sheet side to deteriorate the sheet property. Furthermore, an organic component amount with respect to the dielectric inorganic colorant become relatively large and a density of the inorganic dielectric colorant powder reduces, so that it easily leads to problems that time required by binder removal becomes long, volume shrinkage increases in the binder removal step, the electrode layers deform, and cracks increase.

Figure 3:
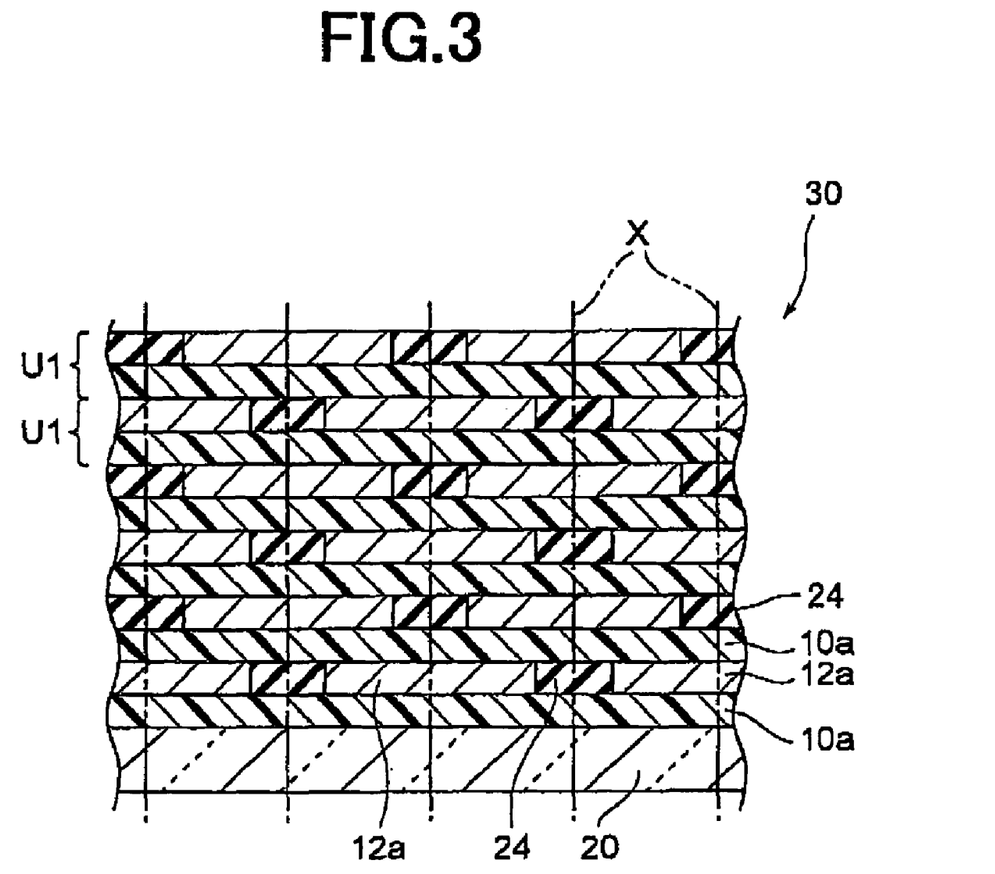
FIG. 3 is a schematic sectional view showing a step continued from FIG. 2.

To stack the green sheets 10a with the electrode layer 12a and the dielectric blank pattern layer 24 formed, for example, by assuming their stacked structure as one stacking unit U1, a plurality of the stacking units U1 may be stacked as shown in FIG. 3 to form a multilayer body 30. As shown in FIG. 3, when stacking the stacking units U1, the electrode layers 12a in the stacking units U1 stacked to be adjacent to each other are stacked to have an alternate positional relationship.

After completing the multilayer body 30, the multilayer body 30 is cut along a cutting line X to be the capacitor body 4 shown in FIG. 1 after firing. Note that a little thick external green sheet without an electrode layer is stacked on top and at bottom in the stacking direction of the actual multilayer body 30.

The cut green chip is subjected to a binder removal processing and firing processing, then, thermal treatment is performed thereon for reoxidizing the dielectric layers.

The binder removal processing may be performed under a normal condition, but when using Ni, a Ni alloy or other base metal as the conductive material of the internal electrode layer, it is particularly preferable to perform under the condition below.

Temperature raising rate: 5 to 300° C. per an hour

Holding temperature: 200 to 600° C.

Holding time: 0.5 to 20 hours

Atmosphere: in the air or wet mixed gas of $N_2$ and $H_2$

The firing condition is preferably as below,

Temperature raising rate: 50 to 500° C. per an hour

Holding temperature: 1100 to 1300° C.

Holding time: 0.5 to 8 hours

Cooling rate: 50 to 500° C. per an hour

Atmosphere: wet mixed gas of $N_2$ and $H_2$, etc.

Note that an oxygen partial pressure in an air atmosphere at firing is preferably $10^{-2}$ Pa or lower, and particularly $10^{-2}$ to $10^{-8}$ Pa. When exceeding the range, the internal electrode layers tend to oxidize, while when the oxygen partial pressure is too low, it is liable that an electrode material of the internal electrode layers are abnormally sintered to be broken.

Thermal treatment after performing firing as above is performed with a holding temperature or highest temperature of preferably 1000° C. or higher, and more preferably 1000 to 1100° C. When the holding temperature or the highest temperature at the time of thermal treatment is less than the above range, oxidization of the dielectric material becomes insufficient to decline the capacity, furthermore, it reacts with the dielectric substrate and the lifetime tends to become short. An oxygen partial pressure at the thermal treatment is higher than that in a reducing atmosphere at firing, and preferably $10^{-3}$ to 1 Pa, and more preferably $10^{-2}$ to 1 Pa. When less than the range, reoxidization of the dielectric layer 2 becomes difficult, while when exceeding the range, the internal electrode layers 12 tends to be oxidized.

The thus obtained sintered body (element body 4) is subjected to end surface polishing, for example, by barrel polishing or sandblasting, etc., a terminal electrode paste is burnt thereon and the terminal electrodes 6 and 8 are plated, etc., so that the terminal electrodes 6 and 8 are formed.

The multilayer ceramic capacitor of the present invention produced as above is mounted on a print substrate, etc., by soldering, etc. And used for a variety of electronic apparatuses.

In the production method of the multilayer ceramic capacitor according to the present embodiment, the second weight ratio (B) of the organic binder component with respect to the inorganic dielectric colorant powder in the electrode level difference absorbing dielectric paste is larger than the first weight ratio (A) of the organic binder component with respect to the inorganic dielectric colorant powder in the green sheet slurry. Therefore, in the multilayer body 30, adhesiveness between the green sheet 10a and dielectric blank pattern layer 24 contacting in the stacking direction can be improved.

As a result, in the present embodiment, even when producing a multilayer ceramic device, such as a multilayer ceramic capacitor having a high capacity, wherein particularly a thickness of the green sheet is made as thin as 3 µm or thinner (a thickness between layers is 2.5 µm or thinner in the multilayer body after firing), adhesiveness between the green sheet 10a and dielectric blank pattern layer 24 can be improved.

Accordingly, green sheets 10a do not deviate from one another at stacking, positional deviation hardly arises between patterns of the upper and lower electrode layers 12a, the positional deviation does not accumulate even when the layers increase, and cutting defects are not caused in the cutting step of the multilayer body 30. Also, stacking deviation and cracks of the multilayer body, etc. are hardly caused in the cutting step. Furthermore, also in the binder removal step and firing step to be successively performed thereafter, chaps and cracks along boundaries of the multilayer body 30 hardly arise. Accordingly, in the present embodiment, it is possible to produce a multilayer ceramic capacitor at a high production yield without causing unsticking between layers and internal defects, etc.

Moreover, in the present embodiment, the dielectric blank pattern layer 24 is formed on the level difference gap portions of the electrode pattern layer 12a and the surface of the electrode pattern layer 12a is made flat without any level differences, so that disadvantages due to level differences at stacking or after firing can be eliminated.

Note that the present invention is not limited to the above embodiments and may be variously modified within the scope of the present invention.

For example, the method of the present invention is not limited to a production method of a multilayer ceramic capacitor and can be applied as a production method of other multilayer type electronic devices.

EXAMPLES

Below, the present invention will be explained based on furthermore detailed examples, but the present invention is not limited to the examples.

Example 1

Production of Green Sheet Slurry

As a starting material, $BaTiO_3$ powder having an average particle diameter of 0.35 µm (BT-02 made by Sakai Chemical Industry Co., Ltd.) was used. To attain 3 mole % of $(Ba_{0.6}Ca_{0.4})SiO_3$, 2 mol % of $Y_2O_3$, 2 mole % (in terms of MgO) of $MgCO_3$, 0.4 mol % (in terms of MnO) of $MnCO_3$, and 0.1 mole % Of $V_2O_5$ with respect to 100 moles of the $BaTiO_3$ powder, wet mixing was performed by a ball mill for 16 hours, then, dried by a spray drier, so that a dielectric inorganic colorant powder was obtained.

100 parts by weight of the dielectric inorganic colorant powder, 6 parts by weight of a polyvinyl butyral resin (PVB), 3 parts by weight of dioctyl phthalate (DOP) as a plasticizer, 60 parts by weight of methylethyl ketone, 40 parts by weight of ethanol and 20 parts by weight of toluene were wet mixed by a ball mill with zirconia media having a diameter of 1 mm for 20 hours, so that a dielectric slurry (green sheet slurry) was obtained. A ratio of organic binder component in the dielectric slurry was 9 wt % with respect to the dielectric inorganic colorant powder.

Electrode Paste (Electrode Layer Paste to be Transferred)

By adding 100 parts by weight of an organic vehicle (obtained by dissolving 5 parts by weight of an ethyl cellulose resin in 95 parts by weight of terpineol) to 100 parts by weight of Ni particles having an average particle diameter of 0.4 µm, kneading with a triple-roll to obtain an electrode paste.

Production of Electrode Level Difference Absorbing Dielectric Paste 100 parts by weight of the same dielectric inorganic colorant powder as that used for the green sheet slurry as explained above is added with 4.5 parts by weight of an ethyl cellulose resin as a polymeric resin, 6.3 parts by weight of benzylbutyl phthalate (BBP) as a plasticizer and 90 parts by weight of terpineol as a solvent, and wet mixed by a mixer mill with zirconia media having a diameter of 1 mm for 15 hours, so that an electrode level difference absorbing dielectric paste was obtained.

A ratio of organic binder component (polymeric resin+ plasticizer) in the electrode level difference absorbing dielectric paste is 10.8 wt % with respect to the dielectric inorganic colorant powder, which is larger than the organic binder component ratio of 9 wt % in the green sheet slurry as explained above by 1.8 wt %. Also, an amount of the plasticizer in the electrode level difference absorbing dielectric paste is 140 wt % with respect to the polymeric resin.

Production of Multilayer Ceramic Capacitor Sample

By using the green sheet slurry obtained as above, a dielectric slurry film was formed on a carrier sheet by a nozzle method and dried, so that a dielectric green sheet 10a having a thickness of 3 µm was obtained. On this dielectric green sheet 10a, an electrode pattern layer 12a having a predetermined pattern to be an electrode layer was formed by screen printing by using the above conductive electrode paste.

A thickness of the electrode layer 12a after drying was 1.5 µm. Next, to bury electrode level difference generated by printing of the electrode pattern layer 12a, the electrode level difference absorbing dielectric paste was used to form a dielectric blank pattern layer 24 on level difference gap portions excepting portions corresponding to the electrode pattern by screen printing. A thickness of the dielectric blank pattern layer 24 after drying was 1.5 μm.

Next, the dielectric green sheets 10a provided with the electrode pattern layer 12a and dielectric blank pattern layer 24 are stacked by 300 layers while aligning to attain a structure, wherein the electrode pattern layers 12 are formed alternately, so that a multilayer body 30 was obtained. On top and bottom of the multilayer body 30 were sandwiched by external sheet formed only by a dielectric having a thickness of 100 μm, pressed and cut to obtain a ceramic green multilayer chip.

Evaluation on Characteristics

The obtained chip exhibited no unsticking between layers and cutting defects. The chip was subjected to binder removal processing and firing by following a normal method so as to obtain a capacitor element body. By providing external electrodes on both end surfaces of the capacitor element body, a multilayer ceramic capacity sample was completed. The obtained sample chip was checked whether any breakings, cracks, unsticking between layers inside and structure damages were caused by an outside inspection and cut surface observance. Their internal defective rate was 0% and the interlayer thickness was 2.2 μm. the results are shown together in Table 1.

TABLE 1

|  | (Sheet) | | | Ex. 1 (Blank 1) | | | Ex. 2 (Blank 2) | | | Ex. 3 (Blank 3) | | | Ex. 4 (Blank 4) | | | Ex. 5 (Blank 5) | | |
| --- | --- | --- | --- | --- | --- | --- | --- | --- | --- | --- | --- | --- | --- | --- | --- | --- | --- | --- |
|  | phr | wt % | vol % | phr | wt % | vol % | phr | wt % | vol % | phr | wt % | vol % | phr | wt % | vol % | phr | wt % | vol % |
| Inorganic Colorant |  | 100 | 16.67 |  | 100 | 16.7 |  | 100 | 16.7 |  | 100 | 16.7 |  | 100 | 16.7 |  | 100 | 16.7 |
| Resin |  | 6 | 6 |  | 4.5 | 4.5 |  | 4.5 | 4.5 |  | 6 | 6 |  | 6 | 6 |  | 9 | 9 |
| Plasticizer | 50 | 3 | 3 | 140 | 6.3 | 6.3 | 250 | 11.3 | 11.3 | 80 | 4.8 | 4.8 | 100 | 6 | 6 | 30 | 2.7 | 2.7 |
| Organic Binder Component |  | 9 | 9 |  | 10.8 | 10.8 |  | 15.8 | 15.8 |  | 10.8 | 10.8 |  | 12 | 12 |  | 11.7 | 11.7 |
| Inorganic Colorant Ratio of Resin and Plasticizer |  | 9 | 54 |  | 10.8 | 64.8 |  | 15.8 | 94.5 |  | 10.8 | 64.8 |  | 12 | 72 |  | 11.7 | 70.2 |
| Difference of Inorganic Colorant Ratio: (Blank) − (Sheet) |  |  |  |  | 1.8 | 10.8 |  | 6.8 | 40.5 |  | 1.8 | 10.8 |  | 3 | 18 |  | 2.7 | 16.2 |
|  |  |  |  |  | Ethyl Cellulose | |  | Ethyl Cellulose | |  | Butyral | |  | Butyral | |  | Butyral | |
| Property |  |  |  |  |  |  |  |  |  |  |  |  |  |  |  |  |  |  |
| Stacking Property of Ceramic Green Multilayer Chip |  |  |  |  | No Unsticking between Layers | |  | No Unsticking between Layers | |  | No Unsticking between Layers | |  | No Unsticking between Layers | |  | No Unsticking between Layers | |
| Cutting Yield 9% |  |  |  |  | 100 |  |  | 100 |  |  | 100 |  |  | 100 |  |  | 100 |  |
| Internal Defect Rate % of Ceramic Capacitor Samples |  |  |  |  | 0 |  |  | 0 |  |  |  |  |  | 0 |  |  | 0 |  |
| Interlayer Thickness μm |  |  |  |  | 2.2 |  |  | 2.1 |  |  | 2.2 |  |  | 1.6 |  |  | 2.2 |  |

TABLE 2

|  | (Sheet) | | | Comp. Ex. 1 (Blank 6) | | | Comp. Ex. 2 (Blank 7) | | | Comp. Ex. 3 (Blank 8) | | | Ref. Ex. 1 (Blank 9) | | |
| --- | --- | --- | --- | --- | --- | --- | --- | --- | --- | --- | --- | --- | --- | --- | --- |
|  | phr | wt % | vol % | phr | wt % | vol % | phr | wt % | vol % | phr | wt % | vol % | phr | wt % | vol % |
| Inorganic Colorant |  | 100 | 16.67 |  | 100 | 16.7 |  | 100 | 16.7 |  | 100 | 16.7 |  | 100 | 16.7 |
| Resin |  | 6 | 6 |  | 9 | 9 |  | 4.5 | 4.5 |  | 6 | 6 |  | 10 | 10 |
| Plasticizer | 50 | 3 | 3 | 0 | 0 | 0 | 20 | 0.9 | 0.9 | 25 | 1.5 | 1.5 | 0 | 0 | 0 |
| Organic Binder Component |  | 9 | 9 |  | 9 | 9 |  | 5.4 | 5.4 |  | 7.5 | 7.5 |  | 10 | 10 |
| Inorganic Colorant Ratio of Resin and Plasticizer |  | 9 | 54 |  | 9 | 54 |  | 5.4 | 32.4 |  | 7.5 | 45 |  | 10 | 60 |
| Difference of Inorganic Colorant Ratio: (Blank) − (Sheet) |  |  |  |  | 0 | 0 |  | −3.6 | −22 |  | −1.5 | −9 |  | 1 | 6 |
|  |  |  |  |  | Butyral | |  | Ethyl Cellulose | |  | Ethyl Cellulose | |  | Butyral | |
| Property |  |  |  |  |  |  |  |  |  |  |  |  |  |  |  |
| Stacking Property of Ceramic Green Multilayer Chip |  |  |  |  | Unsticking between Layers Frequently Arises | |  | Unsticking between Layers Frequently Arises | |  | Unsticking between Layers Partially Arises | |  | No Unsticking between Layers | |
| Cutting Yield % |  |  |  |  | — |  |  | — |  |  | 50 |  |  | 85 |  |
| Internal Defect Rate % of Ceramic Capacitor Samples |  |  |  |  | — |  |  | — |  |  | 50 |  |  | 40 |  |
| Interlayer Thickness μm |  |  |  |  | — |  |  | — |  |  |  |  |  |  |  |

Example 2

Other than changing an amount of the plasticizer to 11.3 parts by weight in the electrode level difference absorbing dielectric paste, multilayer ceramic capacitor samples were produced in the same way as that in the example 1. In this case, the plasticizer amount in the dielectric paste was 250 wt % with respect to the polymeric resin. Also, the ratio of the organic binder component was 15.8 wt % with respect to the dielectric inorganic colorant powder, which was larger than the organic binder component ratio of 9 wt % in the dielectric slurry by 6.8 wt %.

The obtained ceramic green chip multilayer chip exhibited no unsticking between layers and cutting defects in the same way as in the example 1. Also, internal defects were not observed in the sample chip obtained after firing as in the example 1, and the interlayer thickness was 2.1 µm. The results are listed in Table 1.

Example 3

Other than using 6 parts by weight of a butyral resin as a polymeric resin and 4.8 parts by weight of dioctyl phthalate (DOP) as a plasticizer in the electrode level difference absorbing dielectric paste, multilayer ceramic capacitor sample was produced in the same way as that in the example 1. In this case, an amount of the plasticizer in the dielectric paste was 80 wt % with respect to the polymeric resin. Also, a ratio of the organic binder component was 10.8 wt % with respect to the dielectric inorganic colorant powder, which was larger than the organic binder component ratio of 9 wt % in the dielectric slurry by 1.8 wt %.

The obtained ceramic green multilayer chip exhibited no unsticking between layers and cutting defects in the same way as in the example 1, also, the interlayer thickness of the sample chip obtained after firing was 2.2 µm, and no internal defects were observed. The results are listed in Table 1.

Example 4

By using the same green sheet slurry as that in the example 1, a dielectric green sheet having a thickness of 2.4 µm after drying was produced. Also, other than changing the polymeric resin to 6 parts by weight of a butyral resin and the plasticizer to 6 parts by weight of dioctyl phthalate (DOP), an electrode level difference absorbing dielectric paste was produced in the same way as that in the example 1.

Other than using the dielectric green sheet and the electrode level difference absorbing dielectric paste, multilayer ceramic capacitor sample was produced in the same way as that in the example 1. In this case, an amount of the plasticizer in the dielectric paste was 100 wt % with respect to the polymeric resin. Also, a ratio of the organic binder component was 12 wt % with respect to the dielectric inorganic colorant powder, which was larger than the organic binder component ratio of 9 wt % in the dielectric slurry by 3 wt %.

The obtained ceramic green multilayer chip exhibited no unsticking between layers and cutting defects in the same way as in the example 1. Also, the interlayer thickness of the sample chip obtained after firing was 1.6 µm, and no internal defects were observed. The results are listed in Table 1.

Example 5

Other than using 9 parts by weight of a butyral resin as a polymeric resin and 2.7 parts by weight of dioctyl phthalate (DOP) as a plasticizer in the electrode level difference absorbing dielectric paste, multilayer ceramic capacitor sample was produced in the same way as that in the example 1. In this case, an amount of the plasticizer in the dielectric paste was 30 wt % with respect to the polymeric resin. Also, a ratio of the organic binder component was 11.7 wt % with respect to the dielectric inorganic colorant powder, which was larger than the organic binder component ratio of 9 wt % in the dielectric slurry by 2.7 wt %.

The obtained ceramic green multilayer chip exhibited no unsticking between layers and cutting defects in the same way as in the example 1. Also, the interlayer thickness of the sample chip obtained after firing was 2.2 µm, and no internal defects were observed. The results are listed in Table 1, Comparative Example 1

Other than not adding a plasticizer and changing the polymer resin to 9 parts by weight of a polyvinyl butyral resin in the electrode level difference absorbing dielectric paste, an electrode layer and a dielectric blank pattern layer were formed on the dielectric green sheet as in the same way as that in the example 1.

In this case, a plasticizer was not included in the electrode level difference absorbing dielectric paste, and a ratio of the organic binder component in the electrode level difference absorbing dielectric paste was 9 wt % with respect to the dielectric inorganic colorant powder, which was the same ratio as the organic binder component ratio of 9 wt % in the dielectric slurry.

In the same way as in the example 1, the dielectric green sheets provided with the electrode layer and dielectric blank pattern layer were stacked, pressed and cut, but adhesiveness between the electrode and level difference absorbing surface and dielectric sheet surface was weak and unsticking between layers frequently occurred after cutting, so that a multilayer chip was not able to be obtained. The results are listed in Table 2.

Comparative Example 2

Other than changing an amount of the plasticizer to 0.9 parts by weight in the electrode level difference absorbing dielectric paste, an electrode layer and a dielectric blank pattern layer were formed on the dielectric green sheet as in the same way as that in the example 1.

In this case, the amount of the plasticizer was 20 parts by weight with respect to the polymeric resin in the electrode level difference absorbing dielectric paste, and a ratio of the organic binder component was 5.4 wt % with respect to the dielectric inorganic colorant powder, which was smaller than the organic binder component ratio of 9 wt % in the dielectric slurry by 3.6 wt %.

In the same way as in the example 1, the dielectric green sheets provided with the electrode layer and dielectric blank pattern layer were stacked, pressed and cut, but adhesiveness between the electrode and level difference absorbing surface and dielectric sheet surface was weak and unsticking between layers frequently occurred after cutting, so that a multilayer chip was not able to be obtained. The results are listed in Table 2.

Comparative Example 3

Other than changing the polymeric resin to 6 parts by weight of an ethyl cellulose resin and the plasticizer to 1.5 parts by weight of benzylbutyl phthalate (BBP) in the electrode level difference absorbing dielectric paste, an electrode layer and a dielectric blank pattern layer were formed on the dielectric green sheet as in the same way as that in the example 1.

In this case, the amount of the plasticizer was 25 wt % with respect to the polymeric resin in the electrode level difference absorbing dielectric paste, and a ratio of the organic binder component was 7.5 wt % with respect to the dielectric inorganic colorant powder, which was smaller than the organic binder component ratio of 9 wt % in the dielectric slurry by 1.5 wt %.

In the same way as in the example 1, the dielectric green sheets provided with the electrode layer and dielectric blank pattern layer were stacked, pressed and cut, but there were chips exhibiting unsticking between layers, and the cutting yield was 50%. The internal defect rate in the samples fired in the same way as in the example 1 was 50%. The results are listed in Table 2.

Reference Example 1

Other than not adding a plasticizer and changing the polymer resin to 10 parts by weight of a polyvinyl butyral resin in the electrode level difference absorbing dielectric paste, an electrode layer and a dielectric blank pattern layer were formed on the dielectric green sheet in the same way as that in the example 1.

In this case, a plasticizer was not included in the electrode level difference absorbing dielectric paste, and a ratio of the organic binder component in the electrode level difference absorbing dielectric paste was 10 wt % with respect to the dielectric inorganic colorant powder, which was larger than the organic binder component ratio of 9 wt % in the dielectric slurry by 1 wt %.

In the same way as in the example 1, the dielectric green sheets provided with the electrode layer and dielectric blank pattern layer were stacked, pressed and cut. The cutting yield was 85% and the stacking property was preferable, but the shrinkage rate in the firing step was large due to a large amount of resin, and the internal defect rate was 40% in the samples fired in the same way as in the example 1. The results are listed in Table 2

By comparing the reference example 1 with the example 1, it was confirmed that B−A≧1.5 was preferable when assuming that the rate of the organic binder component with respect to the dielectric inorganic colorant powder in the green sheet slurry was "A" and the ratio of the organic binder component with respect to the dielectric inorganic colorant powder in the electrode level difference absorbing dielectric paste was "B".

As explained above, according to the present invention, it is possible to produce a multilayer ceramic device, such as a multilayer ceramic capacitor having a large capacity, wherein the interlayer thickness is made as thin as about 2.5 μm or thinner, at a high production yield without causing unsticking between layers and internal defects.

The invention claimed is:

1. A production method of a multilayer ceramic device, comprising the steps of:
    forming a green sheet by using a green sheet slurry;
    forming an electrode pattern layer on said green sheet;
    forming a dielectric blank pattern layer on level difference gap portion on said electrode pattern layer so as to bury the level difference on said pattern electrode layer by using an electrode level difference absorbing dielectric paste;
    forming a multilayer body by stacking a plurality of stacking units, wherein the stacking unit is said green sheet formed with said dielectric blank pattern layer and said electrode pattern layer; and
    firing said multilayer body;
    wherein:
    said green sheet slurry includes a first inorganic dielectric colorant powder and a first organic binder component;
    said electrode level difference absorbing dielectric paste includes a second inorganic dielectric colorant powder and a second organic binder component; and
    when a first weight ratio of the first organic binder component with respect to said first inorganic dielectric colorant powder in said green sheet slurry is (A), and a second weight ratio of the second organic binder component with respect to said second inorganic dielectric colorant powder in said electrode level difference absorbing dielectric paste is (B),
    said second weight ratio (B) is larger than said first weight ratio (A),
    a value (B−A) obtained by subtracting the first weight ratio (A) from the second weight ratio (B) is 6.8,
    said second organic binder component consists of a combination of ethyl cellulose and benzylbutyl phthalate,
    a weight ratio of said benzylbutyl phthalate is larger than the same of said ethyl cellulose with respect to said second inorganic dielectric colorant powder,
    the weight ratio of said benzylbutyl phthalate with respect to said second inorganic dielectric colorant powder is 6.3% or more and 11.3% or less, and
    a weight ratio of said first organic binder component with respect to said first inorganic dielectric colorant powder is more than 3 wt % and 16 wt % or less.

2. The production method of a multilayer ceramic device as set forth in claim 1, wherein a thickness of said green sheet is made to be 3 μm or thinner.

3. The production method of a multilayer ceramic device as set forth in claim 2, wherein said second weight ratio (B) in the electrode level difference absorbing dielectric paste is 10.8 to 15.8 wt % and a weight ratio of said ethyl cellulose is 10 wt % or less with respect to said second inorganic dielectric colorant powder.

4. The production method of a multilayer ceramic device as set forth in claim 1, wherein said first organic binder component includes a polyvinyl butyral resin (PVB) and dioctyl phthalate (DOP).

5. The production method of a multilayer ceramic device as set forth in claim 4, wherein a thickness of said green sheet is made to be 3 μm or thinner.

6. A production method of a multilayer ceramic device, comprising:
    forming a green sheet by using a green sheet slurry;
    forming an electrode pattern layer on said green sheet;
    forming a dielectric blank pattern layer on level difference gap portion on said electrode pattern layer so as to bury the level difference on said pattern electrode layer by using an electrode level difference absorbing dielectric paste;

forming a multilayer body by stacking a plurality of stacking units, wherein the stacking unit is said green sheet formed with said dielectric blank pattern layer and said electrode pattern layer; and firing said multilayer body;

wherein:

said green sheet slurry includes a first inorganic dielectric colorant powder and a first organic binder component;

said electrode level difference absorbing dielectric paste includes a second inorganic dielectric colorant powder and a second organic binder component; and when a first weight ratio of the first organic binder component with respect to said first inorganic dielectric colorant powder in said green sheet slurry is (A), and a second weight ratio of the second organic binder component with respect to said second inorganic dielectric colorant powder in said electrode level difference absorbing dielectric paste is (b), said second weight ratio (B) is larger than said first weight ratio (A), a value (B−A) obtained by subtracting the first weight ratio (A) from the second weight ratio (B) is 6.8, said second organic binder component consists of a combination of ethyl cellulose and benzylbutyl phthalate, a weight ratio of said benzylbutyl phthalate is larger than the same of said ethyl cellulose with respect to said second inorganic dielectric colorant powder, the weight ratio of said benzylbutyl phthalate with respect to said ethyl cellulose in said second organic binder component is 140 wt % to 250 wt %, and a weight ratio of said first organic binder component with respect to said first inorganic dielectric colorant powder is more than 3 wt % and 16 wt % or less.

\* \* \* \* \*